E. W. BLUM, W. T. S. JOHNSON & F. KROPF.
RELIEVING ATTACHMENT FOR LATHES.
APPLICATION FILED JAN. 3, 1910.
971,243.
Patented Sept. 27, 1910.
2 SHEETS—SHEET 1.
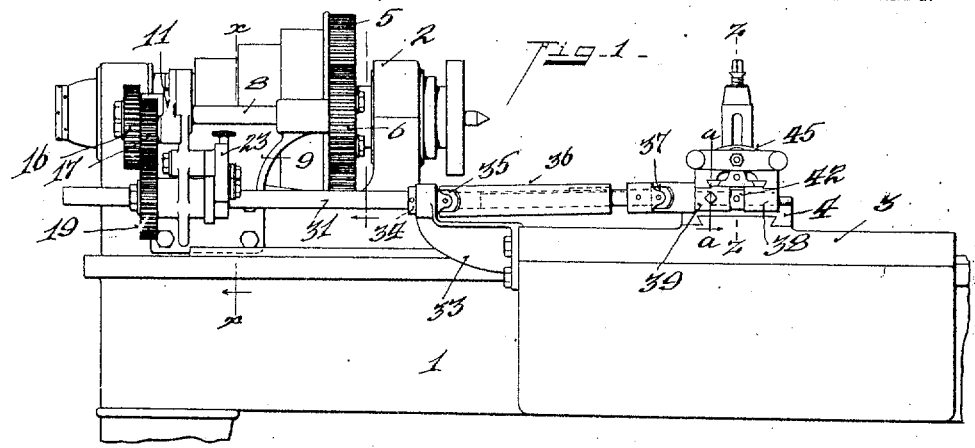
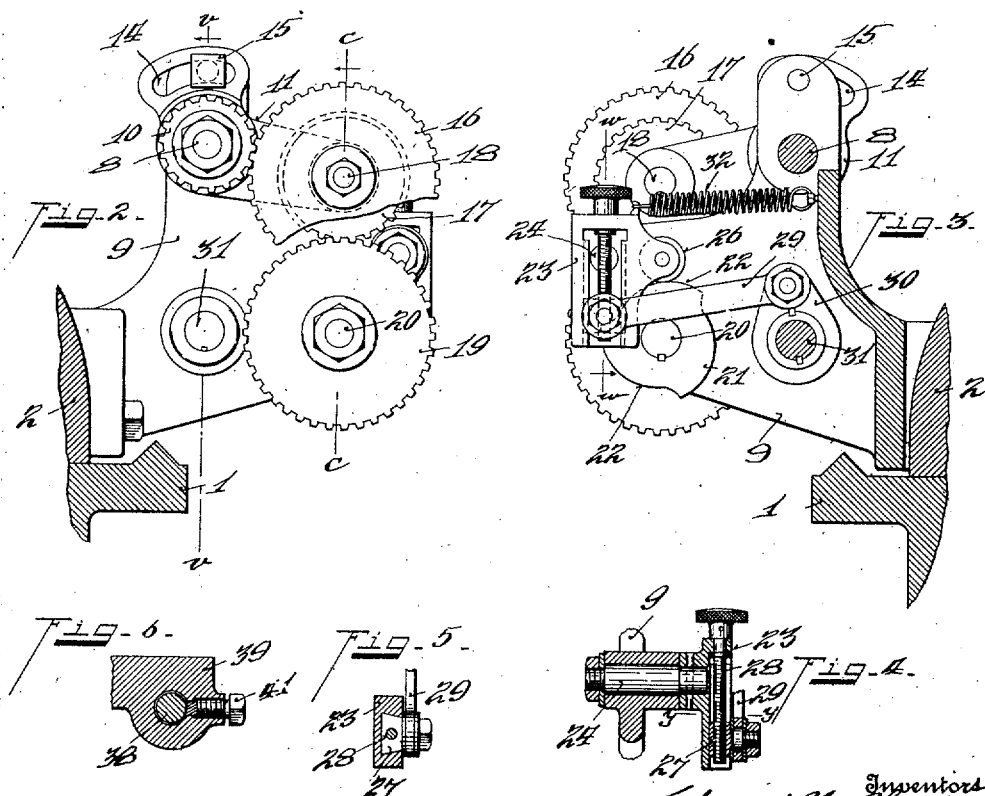

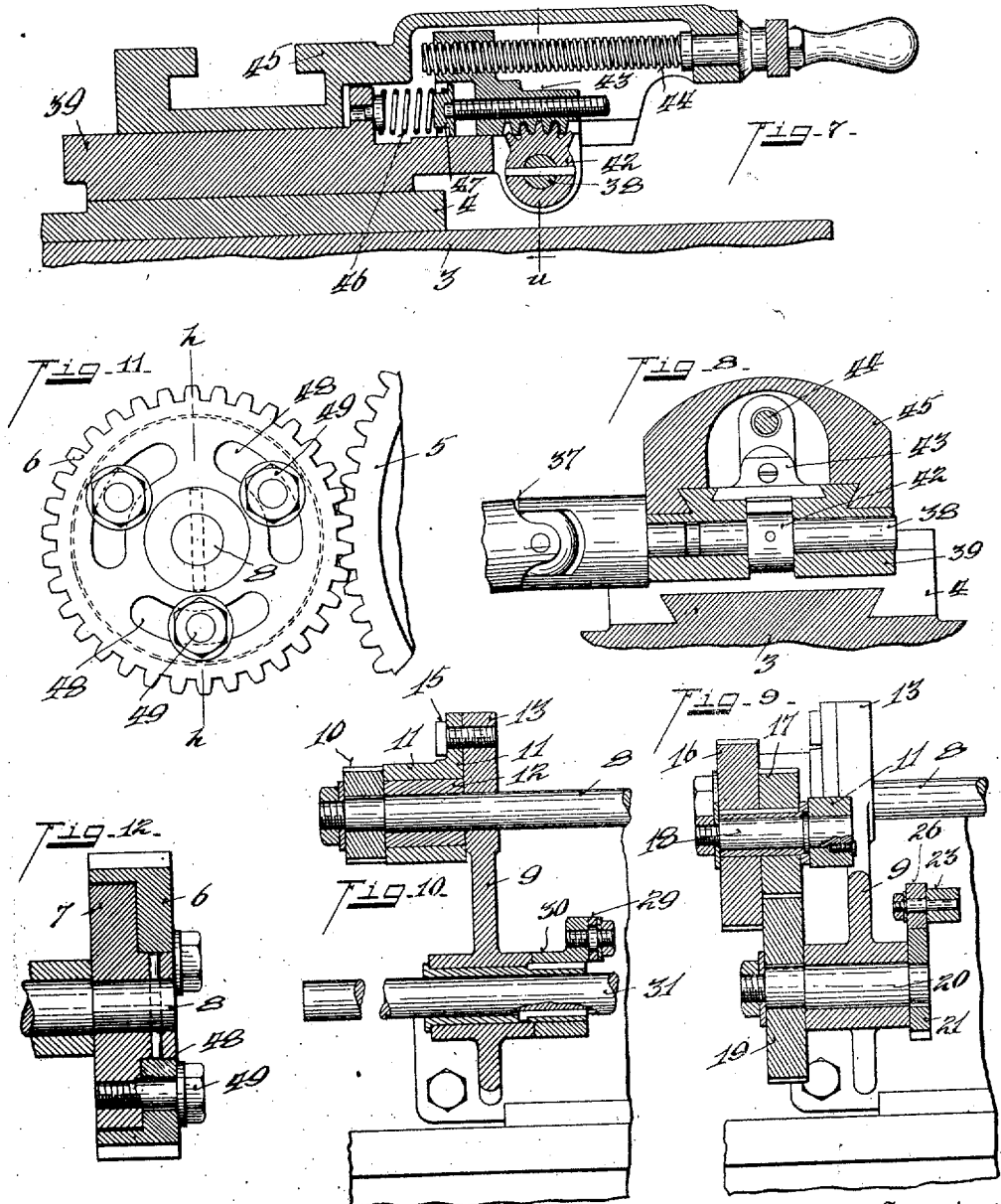

UNITED STATES PATENT OFFICE.

EDWARD W. BLUM, WILLIAM T. S. JOHNSON, AND FREDERICK KROPF, OF CINCINNATI, OHIO, ASSIGNORS TO THE BRADFORD MACHINE TOOL COMPANY, OF CINCINNATI, OHIO, A CORPORATION OF OHIO.

RELIEVING ATTACHMENT FOR LATHES.

971,243.

Specification of Letters Patent. Patented Sept. 27, 1910.

Application filed January 3, 1910. Serial No. 536,078.

*To all whom it may concern:*

Be it known that we, EDWARD W. BLUM, WILLIAM T. S. JOHNSON, and FREDERICK KROPF, citizens of the United States, residing at Cincinnati, in the county of Hamilton and State of Ohio, have invented certain new and useful Improvements in Relieving Attachments for Lathes, of which the following is a specification.

Our invention relates to an improvement in lathe attachments for turning irregular forms or eccentric surfaces, and, as illustrated, is applied to the front of the lathe.

One of the objects of our invention is to provide a lathe attachment for turning irregular forms or eccentric surfaces with a rotating cam actuating oscillating mechanism for feeding a cutting tool to and from the work, with means for quickly and conveniently changing the length of oscillating stroke.

Another object of our invention is to provide a lathe attachment for controlling the tool movement to and from the work with a system of change gearing, in train with one of the gears of the lathe spindle and with intermediate means for converting rotary into oscillating motion, whereby a given number of tool actuations can be had relative to the spindle rotation and compounded or varied by changing the speed between the spindle and motion converting mechanism.

Another object of our invention is to provide a lathe attachment for controlling the tool feed with means whereby the work can be delicately adjusted relative to the cutting tool and driving means.

Various other features and details of our invention are more fully set forth in the description of the accompanying drawings, forming a part of this specification, in which:—

Figure 1 is a front elevation of a lathe with our attachment applied. Fig. 2 is an end elevation of the transmission gear between the lathe spindle and oscillating mechanism. Fig. 3 is a section on line *x, x*, Fig. 1. Fig. 4 is a section on line *w, w*, Fig. 1. Fig. 5 is a section on line *y, y*, Fig. 4. Fig. 6 is a section on line *a, a*, Fig. 1. Fig. 7 is an enlarged section on line *z, z*, Fig. 1. Fig. 8 is a section on line *u, u*, Fig. 7. Fig. 9 is a section on line *c, c*, Fig. 2. Fig. 10 is a section on line *v, v*, Fig. 2. Fig. 11 is a detail elevation of the main driving gear of the attachment in mesh with the spindle gear. Fig. 12 is a section on line *h, h*, Fig. 11.

As illustrated, our invention is adapted for turning a series of eccentric surfaces upon horizontally fluted cutting tools, as, for instance, reamers, in providing a relieving surface for the cuttings in rear of the cutting edges of the tool. The lathe cutting tool is fed forward by a positive power feed and quickly returned after a predetermined feed to free the cutting tool from its cutting position for a second operation.

In the drawings a three point cam is provided for actuating oscillating mechanism for conveying reciprocating movements of the lathe cutting tool, with the rotation of the cam equal to that of the lathe spindle. By varying the speed of the cam from that of the lathe spindle a given construction of cam can be employed for varying the number of cutting tool reciprocations during a given rotation of the spindle. Further, in providing the oscillating mechanism with means for adjusting the length of oscillating stroke varying diameters or depths of cut upon the work can be had without changing the cam. These features are highly advantageous in that a given cam may be employed for a variety of uses.

In the drawings 1 represents a lathe bed, 2 the head stock, 3 the carriage provided with the usual tool holding slide 4.

5 represents the back gear mounted on the spindle.

The head stock and carriage may be of any known form of construction and does not form a part of our invention.

6 represents a gear in mesh with the gear 5 upon the spindle, adjustably mounted upon a disk 7, fixed to the shaft 8. While the gear 6 is shown in mesh with the back gear of the spindle, it is obvious that the same may be in train with any gear on the spindle or driven thereby. The shaft 8 is journaled upon a bracket 9 fixed to the head stock projecting therefrom for supporting various elements of our attachment.

10 represents a gear fixed to the opposite end of shaft 8.

11 represents a swinging quadrant journaled upon a sleeve 12, (see Fig. 10), which in turn is mounted upon the shaft 8 and adjacent to the bracket arms 13 formed upon the bracket 9. The quadrant is provided with a curved slot 14, through which a lock screw 15 passes, for locking the quadrant in an adjusted position to the bracket arm 13.

16, 17 represent compound intermediate change gears journaled upon a stud shaft 18, fixed to and projected from the quadrant. The gear 16 is in mesh with gear 10 on shaft 8, and gear 17 is in mesh with gear 19 upon the cam shaft 20 journaled in a bearing formed in the bracket 9. The swinging quadrant 11 is provided to permit of the interchangeability of the gearing mounted thereon for producing varying ratios of speed between the spindle and cam shaft 20.

21 represents a cam fixed upon the shaft 20, and, as illustrated, is a three point cam having three eccentric surfaces 22, terminating with off-sets.

23 represents an oscillating frame fixed to a stud shaft 24, (see Fig. 4) journaled within a bearing formed in the bracket 9. Said frame 23 is provided with an arm extension supporting a roller 26 adapted to travel upon the periphery of the cam 21, rocking the frame 23 with the stud shaft 24 as the axis therefor. The oscillating frame 23 is provided with a slide-way supporting a slide-block 27, (see Fig. 4) and adjusted to and from the axis by means of the screw rod 28 supported with the frame 23.

29 represents a link pivotally connected to the slide-block at one end and to the lever arm 30 at its opposite end. The arm 30 is preferably fixed upon a sleeve journaled with a bearing formed upon the bracket 9. 31 represents a rock shaft splined within the sleeve 30, (see Figs. 3 and 11) thereby permitting longitudinal movement of the rock shaft 31. Thus, as the oscillating frame 23 is actuated by the rotation of the cam 21, it will swing the free end of the frame 23 in a direction according to the outline of the cam surface upon which the roller 26 is bearing, in this instance either to or from the head stock, conveying such rocking action to the rock shaft 31 through the link and arm connections.

The arc of swing of the oscillating frame is always of such a degree as imparted thereto according to the peripheral outline of the cam. The angle of oscillation or rocking action transmitted to the rock shaft 31, however, can be increased or decreased by adjusting the slide-block to or from the axis of the oscillating frame 23. The action controls the feed of the tool relative to the work, and in consequence, the depth of cut.

32 represents a spring, one end of which is fixed to the bracket 9, with the opposite end connected to the oscillating frame 3, for maintaining the roller under tension upon the periphery of the cam and providing an automatic return movement of the oscillating mechanism, when the cam off-sets and roller coincide. From the shaft 31 the oscillating motion is conveyed to the cutting tool, through intermediate flexible connections, compensating for the feed of the tool to and from the lathe center and longitudinally with the feed of the carriage upon the lathe bed.

33 represents a bearing bracket fixed upon one edge of the carriage apron, through which the rock shaft 31 projects and is connected therewith by means of a collar 34, fixed to the shaft 31 upon one side of the bearing of the bracket 33 and an abutting shoulder formed upon one member of the universal coupling 35 fixed to the shaft 31. Through this connection the shaft 31 is free to oscillate and move longitudinally with the carriage and apron feed upon the lathe bed.

36 represents a two part shaft, one member telescoping within the other, in connection with the universal coupling 35 at one end and with the universal coupling 37 at the opposite end.

38 represents a stud shaft journaled within a tool holder base plate 39 fixed upon the carriage slide 4. Said shaft 38 is connected to one member of the universal coupling 37, and held against displacement within the base plate by means of a set screw 41, with its inner end engaging into a peripheral groove formed upon the shaft 38. (See Figs. 6 and 8).

42 represents a rack gear segment fixed upon the stud shaft 38, in mesh with rack teeth formed upon the slide nut 43. (See Figs. 7 and 8).

44 represents a screw rod having a threaded engagement with the slide nut 43, and journaled within a bearing formed within the compound tool holder or slide 45, slidably mounted upon the base plate 39. The compound tool holder is adapted to receive the usual tool post and cutting tool. Thus, as the stud shaft 38 is rocked through its connection with the oscillating mechanism, heretofore described, it will correspondingly actuate the tool holder 45, through the segment rack gear 42, nut 43, and screw rod 44. The screw rod and nut are provided to adjust the cutting tool and its holder initially relative to the work and independent of feed imparted to the tool holder by means of the oscillating mechanism.

46 represents a spring, one end bearing against the base 39, the opposite end against the flange of the disk 47, adjustably mounted upon the nut 43, to assist spring 32 in the automatic return movement of the various parts of the attachment.

In setting the work between the lathe centers, it is clamped in any known manner to the spindle approximately gaged relative to the cutting tool to its initial point or position for commencement of cut, in order that proper time actuations are had in the tool feed upon the rotation of the work, it is delicately set by the following instrumentalities:—

As before described, the gear 6 is adjustably connected upon the disk 7. The adjustment being made through the provision of a series of circular slots 48 formed in the gear 6, through which the set bolts 49, carried by the disk 7, project. To accurately set the work relative to the time actuation of the cutting tool the bolts 49 are loosened, after which the spindle and work are revolved, revolving the gear 6 loosely upon the disk 7 the required degree and the set nuts again tightened. By this means proper coordinate adjustment of the work can be had relative to the reciprocation of the cutting tool. With the three point cam, as illustrated, three reciprocating movements of the tool can be had to and from the work, with the cam rotating at the same speed as the lathe spindle, this will finish the work around the periphery with three relieving or eccentric nuts. If, however, the speed of the cam shaft is changed, say to make two revolutions to one of the spindle, six reciprocating movements of the tool are had.

Having described our invention, we claim:—

1. A device of the class described, in combination with a lathe spindle, drive therefor and carriage, of a rotating cam, a system of gearing between the cam and spindle drive, interchangeable for varying the relative ratio of speed between the spindle and cam, a tool holding slide upon the lathe carriage, a rock shaft in connection with said tool slide, and intermediate connections between said shaft and cam for reciprocating said shaft.

2. A lathe attachment for reciprocating the tool slide thereof, of a rotating cam, means for rotating said cam, a pivoted frame engaging the periphery of said cam for oscillating said frame, a tool slide, a rock shaft in connection with said tool slide, and means in connection with said rock shaft and oscillating frame adapted to be adjusted to and from the axis of said oscillating frame for changing the length of oscillating stroke to said rock shaft.

3. In a device of the class described, in combination with a lathe spindle, driving mechanism therefor and carriage, of a rotating cam, means in connection with said driving mechanism and cam for rotating the same, a tool slide on the carriage, oscillating mechanism interposed between said tool slide and cam actuated by said cam, and means for changing the length of oscillating stroke to said oscillating mechanism.

4. In a device of the class described, in combination with a lathe spindle, driving mechanism therefor and carriage, of a rotating cam, means in connection with said driving mechanism and cam for rotating the same, means for interchangeably varying the relative rotation between cam and driving mechanism, a tool slide on the carriage, oscillating mechanism interposed between said tool slide and cam, and means for changing the length of oscillating stroke to said oscillating mechanism.

5. A device of the class described, in combination with a lathe spindle, drive therefor and carriage, of a rotating cam, means in connection with said spindle drive for rotating the cam, oscillating mechanism actuated by said cam, a shaft movable with the carriage, means in connection with said oscillating mechanism and shaft for conveying oscillating motion to said shaft, means for changing the oscillating movement, to said oscillating mechanism, a tool holding slide upon the lathe carriage and intermediate flexible connections between said slide and shaft for reciprocating said slide.

6. A device of the class described, in combination with a lathe spindle, drive therefor, and carriage, of a rotating cam, means in connection with said spindle drive for rotating the cam, oscillating mechanism actuated by said cam, a shaft movable with the carriage, means interposed between said oscillating mechanism and shaft for conveying oscillating motion to said shaft, a tool holding slide upon the lathe carriage, intermediate flexible connections between said slide and shaft for reciprocating said slide, and means for adjusting said slide to and from the lathe spindle independent of said reciprocation.

7. In a device of the class described, in combination with a lathe spindle, drive therefor and carriage, of a rotating cam, means in connection with said spindle drive for rotating the cam, a shaft movable with the carriage, means interposed between said shaft and cam for converting rotary into oscillating motion, a tool holding slide upon the lathe carriage, intermediate connections between said slide and shaft for reciprocating said slide, and means for coördinately adjusting the work upon the spindle, cam driving means and cutting tool, initially.

8. In a lathe attachment for controlling the feed of its tool slide and tool, means interposed between the lathe spindle drive and tool slide for converting rotary into oscillating motion in coördinate relative actuation of tool feed with the rotation of the spindle, means for interchangeably varying said relative actuation, and means for coördinately adjusting the work upon the spindle, cam driving means and cutting tool, initially.

In testimony whereof, we have hereunto set our hand.

EDWARD W. BLUM.
WILLIAM T. S. JOHNSON.
FREDERICK KROPF.

Witnesses:
OLIVER B. KAISER,
EMMA SPENER.